Feb. 4, 1964      G. L. BABER      3,120,055
TRIMMING TOOL FOR LAMINATED PLASTICS
Filed March 7, 1963
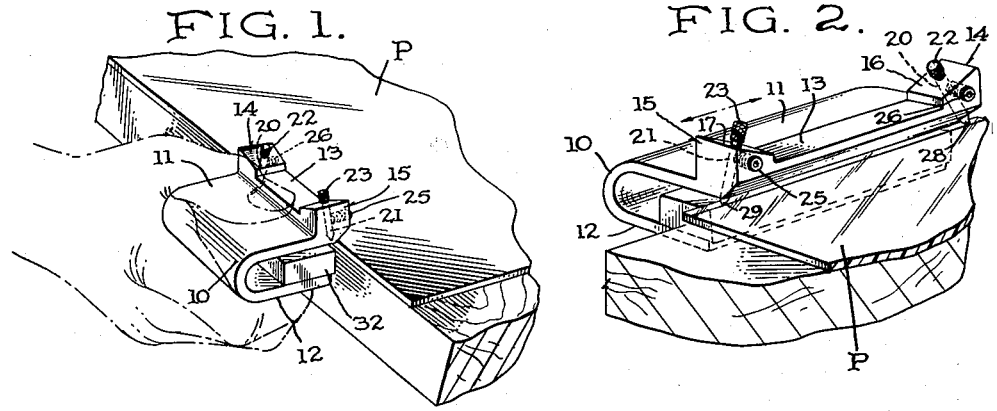
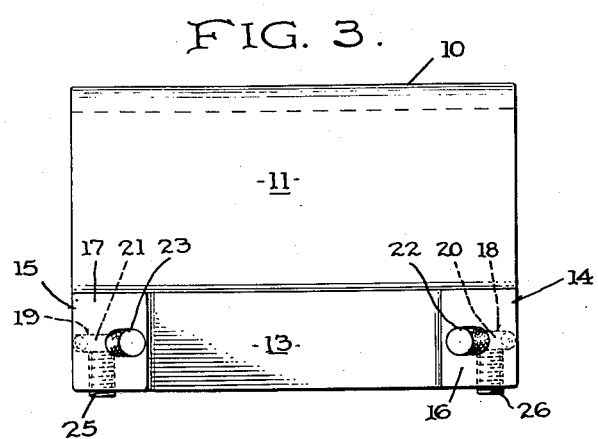
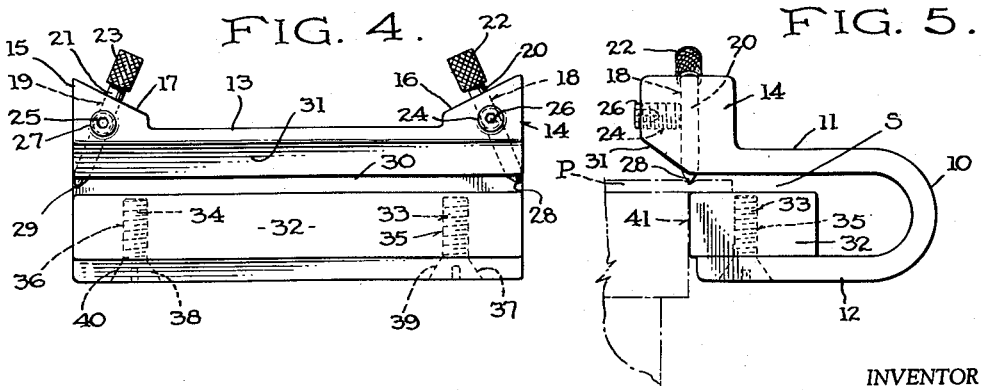
INVENTOR
GLENN L. BABER
BY Cameron, Kerkam & Sutton
ATTORNEYS

United States Patent Office 3,120,055
Patented Feb. 4, 1964

3,120,055
TRIMMING TOOL FOR LAMINATED PLASTICS
Glenn L. Baber, R.R. 2, Chariton, Iowa
Filed Mar. 7, 1963, Ser. No. 263,502
5 Claims. (Cl. 30—164.9)

This invention relates to a trimming or scoring tool designed to facilitate the trimming or breaking off of the excess "hand" or overhang of laminated plastic sheets, such as formica, applied as coverings on tabletops, sink tops, counter tops, dresser tops, splash boards, panels and other analogous covered surfaces.

It has been usual in the past to saw or cut off the excess of such tops flush with the outer edge of the surface being covered. These methods are time consuming and unsatisfactory, frequently resulting in an uneven or "ragged" edge and in chipping and scratching of the surface of the plastic.

Further, in attempting to saw the "hand" of the plastic cover flush with the plane vertical face of the member being covered, damage to the vertical face frequently results and difficulties arise in attempting to trim the plastic edge in restricted corners or other hard to reach areas.

The present invention contemplates the provision of a tool which may be used with either hand and which is provided with guide means at its lower extremity to automatically center the scoring points positioned thereabove on the exact edge of the surface being covered, to eliminate scratching and chipping of the plastic surface and to insure an accurate score line exactly flush with the vertical surface of the article being covered.

The tool broadly comprises a flattened, U-shaped hand grasp or base member to the lower, inner edge of which is affixed an aligning block or guide, the upper longitudinal edge being provided with spaced apart, angularly disposed cutting or scoring pins provided with rounded scoring heads whose centers are exactly aligned with the rectilinear vertical, plane surface of the alignment block.

The cutter point pins are preferably adjustable in length, whereby the depth of the scoring or cut made in the laminated plastic by the cutter points may be regulated, as desired. The cutter point pins are angularly mounted through bosses disposed at the lateral extremities of the forward edge of the upper plate of the tool, in alignment with the vertical, plane surface of the guide block disposed along the lower interior thereof in such fashion that the tool automatically positions itself and may be used with either hand to score with either of said laterally disposed scoring points.

Using this tool, damage to the surface of the plastic coating and to the outer surface of the member being covered are eliminated and the scoring and trimming operation is greatly facilitated. After the plastic has been appropriately scored with the tool, the "hand" or overhang may be readily snapped off along the score line flush with the outer surface of the table, sink or other object being covered, by a downward blow or pressure on the overhang of the plastic. A clean break results in the outer edge of the plastic, exactly aligned with the outer, vertical surface of the article being covered.

The U-shaped frame of the tool is preferably of such dimensions as to fit readily and comfortably within the normal hand, and as aforesaid, may be used with either hand with equal facility.

It is therefore a primary object of this invention to evolve a simplified tool to score or trim the overhang of a laminated plastic covering on an article of furniture or other surface.

It is an object of this invention to evolve such a tool which is instantly self-centering and which will provide an exactly aligned score or trim line flush with the outer, vertical surface of the article covered by the plastic.

It is another object of this invention to evolve such a tool in which the cutting or scoring points are readily adjustable to regulate the depth of the scoring or cut in the plastic surface, depending upon its thickness.

It is a further object of this invention to evolve such a tool which may be used in either hand and which will score equally well regardless of its direction of motion.

Other and further objects of this invention will become apparent as this specification proceeds.

Referring to the drawings,

FIG. 1 is a perspecive view, parially in phantom, of the tool in position to score or trim the edge of a plastic coating applied to a plane surface;

FIG. 2 is a perspective view of the tool in position, from the opposite side, partially in phantom;

FIG. 3 is a top plan view, partially in phantom, of the tool;

FIG. 4 is an end view of the tool, partially in phantom; and

FIG. 5 is a side view thereof, also partially in phantom.

In the drawings, 10 indicates broadly the body or frame of the tool which is preferably of flattened, U-shaped form of greater length than width and provided with upper and lower parallel, flattened surfaces or plates 11 and 12 joined in a smooth curve at their rear extremities. The entire frame structure is preferably cast of aluminum or other light, strong metal. Upper plate 11 is provided along its upper, forward edge with a raised boss section 13. Boss section 13 is preferably provided at each lateral extremity with identical, angular scoring pin bosses 14 and 15.

Scoring pin bosses 14 and 15 are preferably formed integral with boss 13 of upper plate 11. As shown, bosses 14 and 15 are preferably in the form of truncated rectangles with their upper surfaces 16 and 17 downwardly and inwardly inclined at an angle of approximately 30°.

Scoring pin bores 18 and 19 are preferably made downwardly through the centers of surfaces 16 and 17 of bosses 14 and 15 and, as shown, are preferably disposed at an angle of some 30° from the vertical. Scoring pins 20 and 21 are disposed downwardly in bores 18 and 19, respectively. Pins 20 and 21 may be screw threaded about their outer peripheries to register in screw threads provided about the interiors of bores 18 and 19. If not screw threaded, pins 20 and 21 are so dimensioned as to fit closely within bores 18 and 19.

Pins 20 and 21 are provided at their upper extremities with knurled heads 22 and 23 through which they may be rotated or adjusted in bores 18 and 19.

Set screws 24 and 25 are provided in appropriate screw threaded tap holes 26 and 27 let into the forward faces of bosses 14 and 15, tap holes 26 and 27 intersecting angular pin bores 18 and 19. Set screws 24 and 25 are preferably of the Allen type and are provided with tool-receiving recesses at their outer faces. As shown, set screws 24 and 25 are designed to screw inwardly into bosses 14 and 15 to contact the lateral walls of pins 20 and 21 to maintain pins 20 and 21 in desired position within bores 18 and 19.

Scoring pins 20 and 21 are preferably provided at their lower, protruding extremities with rounded carborundum heads 28 and 29 of which, as shown, project downwardly an appreciable distance beneath the lower edge 30 of upper plate 11. Their extent of protrusion may be adjusted by means of set screws 24 and 25.

The outer, lower surface 31 of boss 13 is preferably rectilinear and is upwardly inclined across the length of boss 13 at an angle of approximately 45° to insure clearance of the plastic surface and to permit observation and proper positioning of carborundum points 28 and 29 against the upper surface of the plastic being scored.

Aligning block 32, preferably an elongate rectangle and formed of hard plastic or analogous material, is shown laterally disposed across the inner, upper surface of lower plate 12. It is maintained in position thereon by means of appropriate retaining screws 33 and 34 which register in appropriate bores 35 and 36 vertically disposed in the lateral extremities of block 32. As shown, slotted heads 37 and 38 of screws 33 and 34, respectively, closely fit in mitred recesses 39 and 40 let through the lateral extremities of lower plate 12 whereby heads 37 and 38 of screws 33 and 34 fit flush therein.

With particular reference to FIG. 5, it will be seen that the outer, vertical surface 41 of guide block 32 is preferably aligned in a vertical plane passing directly through the centers of carborundum points 28 and 29 of pins 20 and 21, respectively. This alignment of vertical face 41 of block 32 with the centers of points 28 and 29 insures an accurate and aligned scoring of the plastic surface exactly flush with the rectilinear face of the table, sink or other member on which the plastic surface is applied.

As aforesaid, due to the nature of the mounting of pins 20 and 21 in bores 18 and 19 of bosses 14 and 15 the downward extension of carborundum points 28 and 29 thereof may be adjusted, by means of set screws 24 and 25, to provide as deep a scoring or penetration of the plastic coating P as is required, depending upon the thickness of the plastic coating P. Thus, for a thin plastic, heads 28 and 29 need protrude only slightly and for a thicker plastic coating this protrusion should be proportionately increased.

If desired, alignment block 32 may be adjustably mounted on the upper surface of lower arm 12 by inwardly slotting lower arm 12 from its outer edge to any required inward depth thus making it possible to adjust the relative position of outer face 41 thereof with respect to the vertical plane through the centers of points 28 and 29.

It will be noted that the space S between the lower surface of upper plate 11 and the upper, planar surface of block 32 extends rearwardly from the line of points 28—29 to the rear inner wall of housing 10, an appreciable distance. Space S is designed to accommodate the "hand" or overhang of the plastic surface P, regardless of its outward extent.

Normally, the overhang of the plastic P will not exceed more than a fraction of an inch, but if it should exceed the depth of the aforesaid space S within the tool, it becomes necessary to cut off the excess outer edge of the plastic overhang to make it accommodatable within the space S. Obviously, by extending the width of upper and lower plates 11 and 12 the tool can be made of such dimensions as to accommodate a much wider overhang.

It is usual, of course, in applying laminated plastic sheets to tables, sinks and analogous equipment to select a sheet of plastic which is cut to substantially the correct dimensions of the surface to be covered, in order to eliminate waste.

The length of the tool shown is preferably approximately 4 inches and its width is on the order of 3 inches. These dimensions may be varied, as desired, depending upon the nature of the plastic and the surface being operated upon. The size and degree of protrusion of the scoring points 28 and 29 may also be varied depending upon the nature of the laminated plastic being scored.

As previously stated, points 28 and 29 are preferably rounded in the form of hemispheres and are preferably formed of carborundum or other extremely hard and impervious alloy. If desired, sharpened points could be used, the objection to such points being that due to the hardness of the formica or other laminated plastic being scored such cutting edges normally lose their sharpness in a short period of time and must be either resharpened or replaced.

As has previously been stated, scoring pins 20 and 21 are preferably angularly inclined downwardly and outwardly through bosses 14 and 15 at equal angles of approximately 30° from the vertical. This disposition of pins 20 and 21 assures the same angle of attack against the surface being scored of each point 28 and 29 thereof. Due to this angular disposition of pins 20 and 21, the tool may be operated either from left to right or from right to left, the leading point 28 or 29 performing the scoring operation, depending upon the direction of movement of the tool. Further, by virtue of the disposition of pins 20 and 21 and heads 28 and 29 thereof, the tool is susceptible of use either in the right or left hand of the operator and will function equally well regardless of which hand is utilized and in which direction the tool is pushed along the plastic being scored.

In using the tool, as shown in FIGS. 1, 2 and 5, the operator grasps the tool firmly in his hand and then presents the outer, vertical face 41 of guide block 32 flush against the outer, vertical surface of the article covered with the plastic sheet P. The operator then forces the tool downwardly, maintaining surface 41 of guide block 32 firmly against the vertical, outer surface of the article covered by the plastic until heads 28 and 29 of scoring pins 20 and 21 bear firmly downwardly against the plastic surface in vertical alignment with the outer, plane surface 41 of guide block 32. Applying considerable downward pressure, the operator then slides the tool longitudinally along the outer wall of the table, sink or other article covered with the plastic coating P and thus scores the plastic deeply exactly along the flush edge of the vertical outer surface of the article. After the desired length of score has been made along the side of the article covered with the plastic sheet P the scoring tool is removed and the overhang or "hand" is snapped-off by downward pressure thereagainst, shearing cleanly along the score line at the exact edge of the outer, vertical surface of the article being covered.

As has been previously stated, due to the angularity of pins 20 and 21 through bosses 14 and 15, points 28 and 29 thereof extend outwardly to the extreme lateral, forward edges of upper plate 11 and thus points 28 and 29 will cut or score completely into the sharpest corner or the most acute curve on which the plastic coating P may be applied. It will thus be seen that the tool may be used even in the most restricted space accurately to score the plastic to the exact vertical line of the surface covered, regardless of its curvature or angularity. This type of cutting was previously impossible with conventional saws or cutters and it was frequently necessary when using a conventional saw or cutter to ream out the acutely curved or angular surfaces with a rasp or analogous tool. This necessity has been eliminated in the present tool.

As aforesaid, by virtue of the 45° angular cutback of the lower, outer surface of the face of boss 13, the only portions of the tool which contact the plastic surface being scored are the two scoring points 28 and 29. Thus, any possibility of scratching or chipping the plastic surface adjacent the score line is eliminated. Further, this angular cutback surface 31 enables the operator freely to observe the scoring operation and eliminates any possibility of chafing of the surface of the plastic inwardly of the score line.

It will further be noted that the upper surface of guide block 32 fits under the "hand" or overhang of the plastic.

As previously stated, due to the fact that points 28 and 29 are formed of carborundum and are rounded, points 28 and 29 last indefinitely and seldom require replacement.

The basic theory behind this tool lies in the vertical alignment of the outer, planar face 41 of alignment block 32 in the vertical plane passing through the centers of points 28 and 29, which thus insures proper alignment and a clean and accurate scoring of the plastic exactly flush to the outer, vertical edge of the surface of the article covered with the plastic sheet. The tool thus aligns itself and eliminates any possibility of malscoring or cutting. It thus is susceptible of instantaneous use by even the most unskilled operator.

Throughout the combination equivalents may be substituted for all elements without departing from the spirit of this invention.

The dimensions of the tool may be varied within wide limits without departing from the spirit of the invention.

This specification is by way of description of one preferred embodiment of the invention only. Attention is directed to the appended claims for a limitation of the scope of the invention.

What is claimed is:

1. In a scoring tool for laminated plastic sheets applied to the upper surface of furniture articles, an elongate, U-shaped body of appreciable width comprised of parallel upper and lower plates joined in a smooth curve at their outer extremities, an upstanding main boss disposed along the upper, inner edge of said upper plate, raised, angular bosses at each extremity of said main boss, cutting pins downwardly and outwardly disposed through said angular bosses at an angle of some 30° to the perpendicular, a hard, rounded cutting point at the lower extremity of each of said pins protruding an appreciable distance beneath the lower, lateral extremities of the lower surface of said main boss, an elongate rectangular guide block mounted along the upper, inner surface of said lower plate in such position that its outer, vertical face lies in a vertical plane passing through the centers of said cutting points whereby when the outer, vertical surface of said guide block is fitted flush against the vertical outer surface of an article covered by the plastic sheet and downward pressure and lateral movement are applied to the tool the cutting points thereof will score the plastic sheet along a line flush with the vertical edge of the article covered by the plastic sheet.

2. In a scoring tool for laminated plastic sheets applied to the upper surface of furniture articles, an elongate, U-shaped body of appreciable width comprised of parallel upper and lower plates joined in a smooth curve at their outer extremities, an upstanding main boss disposed along the upper, inner edge of said upper plate, raised, angular bosses at each extremity of said main boss, cutting pins downwardly and outwardly disposed through said angular bosses, a hard, rounded cutting point at the lower extremity of each of said pins protruding an appreciable distance beneath the lower, lateral extremities of the lower surface of said main boss, an elongate rectangular guide block mounted along the upper, inner surface of said lower plate in such position that its outer, vertical face lies in a vertical plane passing through the centers of said cutting points whereby when the outer, vertical surface of said guide block is fitted flush against the vertical outer surface of an article covered by the plastic sheet and downward pressure and lateral movement are applied to the tool the cutting points thereof will score the plastic sheet along a line flush with the vertical edge of the article covered by the plastic sheet.

3. In a scoring tool for laminated plastic sheets applied to the upper surface of furniture articles, an elongate, U-shaped body of appreciable width comprised of parallel upper and lower plates joined in a smooth curve at their outer extremities, an upstanding main boss disposed along the upper, inner edge of said upper plate, raised, angular bosses at each extremity of said main boss, cutting pins downwardly and outwardly disposed through said angular bosses at an angle of some 30° to the perpendicular, a carborundum cutting point at the lower extremity of each of said pins protruding an appreciable distance beneath the lower, lateral extremities of the lower surface of said main boss, an elongate rectangular guide block mounted along the upper, inner surface of said lower plate in such position that its outer, vertical face lies in a vertical plane passing through the centers of said cutting points whereby when the outer, vertical surface of said guide block is fitted flush against the vertical outer surface of an article covered by the plastic sheet and downward pressure and lateral movement are applied to the tool the cutting points thereof will score the plastic sheet along a line flush with the vertical edge of the article covered by the plastic sheet.

4. In a scoring tool for laminated plastic sheets applied to the upper surface of furniture articles, an elongate, U-shaped body of appreciable width comprised of parallel upper and lower plates joined in a smooth curve at their outer extremities, an upstanding main boss disposed along the upper, inner edge of said upper plate, raised, angular bosses at each extremity of said main boss, cutting pins downwardly and outwardly disposed through said angular bosses at an angle of some 30° to the perpendicular, a hard, rounded cutting point at the lower extremity of each of said pins protruding an appreciable distance beneath the lower, lateral extremities of the lower surface of said main boss, set screws let into the forward faces of said raised, angular bosses contacting said cutting pins at their inner extremities, an elongate rectangular guide block mounted along the upper, inner surface of said lower plate in such position that its outer, vertical face lies in a vertical plane passing through the centers of said cutting points whereby when the outer, vertical surface of said guide block is fitted flush against the vertical outer surface of an article covered by the plastic sheet and downward pressure and lateral movement are applied to the tool the cutting points thereof will score the plastic sheet along a line flush with the vertical edge of the article covered by the plastic sheet.

5. In a scoring tool for laminated plastic sheets applied to the upper surface of furniture articles, an elongate, U-shaped body of appreciable width comprised of parallel upper and lower plates joined in a smooth curve at their outer extremities, an upstanding main boss disposed along the upper, inner edge of said upper plate, raised, angular bosses at each extremity of said main boss, cutting pins downwardly and outwardly disposed through said angular bosses, a hard, rounded cutting point at the lower extremity of each of said pins protruding an appreciable distance beneath the lower, lateral extremities of the lower surface of said main boss, set screws let into the forward faces of said raised, angular bosses contacting said cutting pins at their inner extremities, an elongate rectangular guide block mounted along the upper, inner surface of said lower plate in such position that its outer, vertical face lies in a vertical plane passing through the centers of said cutting points whereby when the outer, vertical surface of said guide block is fitted flush against the vertical outer surface of an article covered by the plastic sheet and downward pressure and lateral movement are applied to the tool the cutting points thereof will score the plastic sheet along a line flush with the vertical edge of the article covered by the plastic sheet.

References Cited in the file of this patent

UNITED STATES PATENTS

| | | |
|---|---|---|
| 427,461 | Comstock | May 6, 1890 |
| 467,500 | Fenwick | Jan. 26, 1892 |
| 476,626 | Fowler | June 7, 1892 |
| 1,129,531 | Waligorski | Feb. 23, 1915 |

FOREIGN PATENTS

| | | |
|---|---|---|
| 830,834 | Germany | Feb. 7, 1952 |
| 853,452 | Great Britain | Nov. 9, 1960 |